(12) United States Patent
Bulovic et al.

(10) Patent No.: US 9,910,215 B2
(45) Date of Patent: Mar. 6, 2018

(54) OPTICAL STRUCTURES INCLUDING NANOCRYSTALS

(71) Applicant: Massachusetts Institute of Technology, Cambridge, MA (US)

(72) Inventors: Vladimir Bulovic, Lexington, MA (US); David H. Friend, Jackson, WY (US); Moungi Bawendi, Cambridge, MA (US)

(73) Assignee: MASSACHUSETTS INSTITUTE OF TECHNOLOGY, Cambridge, MA (US)

( * ) Notice: Subject to any disclaimer, the term of this patent is extended or adjusted under 35 U.S.C. 154(b) by 14 days.

(21) Appl. No.: 14/493,222

(22) Filed: Sep. 22, 2014

(65) Prior Publication Data

US 2015/0009706 A1 Jan. 8, 2015

Related U.S. Application Data

(63) Continuation of application No. 12/670,388, filed as application No. PCT/US2008/070840 on Jul. 23, 2008, now abandoned.

(60) Provisional application No. 60/951,305, filed on Jul. 23, 2007.

(51) Int. Cl.
*G02B 6/02* (2006.01)
*F21V 8/00* (2006.01)
*B05D 3/12* (2006.01)
*G02B 6/26* (2006.01)
*G02B 6/12* (2006.01)

(52) U.S. Cl.
CPC ............... *G02B 6/02* (2013.01); *B05D 3/12* (2013.01); *G02B 6/001* (2013.01); *G02B 6/005* (2013.01); *G02B 6/26* (2013.01); *G02B 6/004* (2013.01); *G02B 6/0229* (2013.01); *G02B 2006/1213* (2013.01)

(58) Field of Classification Search
CPC .................................... G02B 6/02; G02B 6/26
See application file for complete search history.

(56) References Cited

U.S. PATENT DOCUMENTS

| | | | | |
|---|---|---|---|---|
| 2001/0046244 A1* | 11/2001 | Klimov et al. | | 372/43 |
| 2003/0142944 A1* | 7/2003 | Sundar et al. | | 385/131 |
| 2004/0004982 A1* | 1/2004 | Eisler et al. | | 372/43 |
| 2004/0109483 A1* | 6/2004 | Simpson et al. | | 372/39 |
| 2006/0039433 A1* | 2/2006 | Simpson | | 372/50.1 |
| 2009/0162011 A1* | 6/2009 | Coe-Sullivan et al. | | 385/31 |
| 2009/0251759 A1* | 10/2009 | Domash et al. | | 359/288 |
| 2010/0314646 A1* | 12/2010 | Breen et al. | | 257/98 |
| 2011/0233483 A1* | 9/2011 | Breen et al. | | 252/519.2 |

* cited by examiner

*Primary Examiner* — Kaveh C Kianni
(74) *Attorney, Agent, or Firm* — Steptoe & Johnson LLP

(57) ABSTRACT

An optical structure can include a nanocrystal on a surface of an optical waveguide in a manner to couple the nanocrystal to the optical field of light propagating through the optical waveguide to generate an emission from the nanocrystal. The structure can be configured to restrict propagation of the emission from the nanocrystal along the waveguide.

10 Claims, 8 Drawing Sheets

OPTICAL STRUCTURES INCLUDING NANOCRYSTALS

CLAIM OF PRIORITY

This application is a continuation of U.S. application Ser. No. 12/670,388, filed Jan. 22, 2010, which claims priority under 35 USC 371 to International Application No. PCT/US2008/070840, filed on Jul. 23, 2008, which claims priority to U.S. Provisional Application Ser. No. 60/951,305, filed Jul. 23, 2007, each of which is incorporated by reference in its entirety.

TECHNICAL FIELD

The invention relates to optical structures including nanocrystals.

BACKGROUND

Optical waveguides, such as fibers and planar waveguides, which take advantage of total internal reflection have been used in a wide range of sensing, communication, and illumination applications. Light can be delivered through optical fibers with great efficiency over long distances because of the perfect mirroring that is provided by the core/cladding dielectric index step interface. Typically, the optical field in an optical fiber element is entirely confined because of this core/cladding interface.

SUMMARY

An optical structure can include a nanocrystal on a surface of an optical waveguide in a manner to couple the nanocrystal to the optical field of light propagating through the optical waveguide to generate an emission from the nanocrystal. For example, one or more semiconductor nanocrystals, or quantum dots, can be placed in the vicinity of an optical structure such as a waveguide, for example, a fiber optic element. The optical field of light which is propagating through the waveguide can couple with the nanocrystal and cause the nanocrystal to emit light.

Advantageously, the light emitting structure can allow for the straightforward and efficient distribution of an excitation light source and coupling to a highly efficient downconverting element which will be useful for a range of lighting applications, including optical displays, sensors, and other applications. The light emitting structure can have particular relevance to solid state lighting applications. An excitation source can be used to efficiently distribute excitation wavelength through the waveguide and downconverted at the point of use to an appropriate spectral composition by applying the right combination of downconverting elements, including nanocrystals. Nanocrystals are an especially appropriate material set because of their broad spectral tunability, long lifetime in photoluminescence (far exceeding that of organic dyes), and easy solution processability.

The output of semiconductor nanocrystal-emitted light from the optical structure can be enhanced by including a periodic variation in the structure. The periodic variation can establish a band gap in the waveguide propagation modes, such that light with frequencies falling within the gap cannot propagate. The periodicity can be selected so that frequencies corresponding to nanocrystal emission are prevented from propagating along the waveguide, but instead are emitted from the optical structure.

The nanocrystal can be a semiconductor nanocrystal. The semiconductor nanocrystal includes a core including a first semiconductor material. The semiconductor nanocrystal can include an overcoating on a surface of the core including a second semiconductor material. The semiconductor nanocrystal can include an outer layer including a compound linked to a surface of the nanocrystal.

In one aspect, an optical structure includes a layer including a nanocrystal capable of emitting light at an emission wavelength when excited by an excitation wavelength, the layer being disposed on a surface of an optical waveguide, the nanocrystal being positioned to be optically coupled to an optical field propagating through the optical waveguide. The optical structure can be configured to restrict propagation of the emission wavelength of light along the waveguide.

In another aspect, a light emitting structure includes a light source arranged to introduce light including an excitation wavelength into an optical waveguide, and a layer including a nanocrystal capable of emitting light at an emission wavelength when excited by the excitation wavelength, the layer being disposed on a surface of the optical waveguide, the nanocrystal being positioned to be optically coupled to an optical field propagating through the optical waveguide. The optical structure can be configured to restrict propagation of the emission wavelength of light along the waveguide.

In another aspect, a method of producing light includes introducing light from a light source including an excitation wavelength into an optical waveguide, the excitation wavelength propagating through the optical waveguide and optically coupling to a nanocrystal included in a layer on a surface of the optical waveguide, and the nanocrystal absorbing the excitation wavelength and emitting an emission wavelength of light. The optical structure can be configured to restrict propagation of the emission wavelength of light along the waveguide. The method can include modifying the surface of the optical waveguide to increase coupling between the optical field and the nanocrystal to allow light to escape at a selected amount at selected locations.

In another aspect, a method of making an optical structure includes placing a layer including a nanocrystal capable of emitting light at an emission wavelength when excited by an excitation wavelength on a surface of an optical waveguide in a position to optically couple the nanocrystal to an optical field propagating through the optical waveguide, and configuring the optical structure to restrict propagation of the emission wavelength of light along the waveguide. Configuring the optical structure to restrict propagation of the emission wavelength of light along the waveguide can include forming a periodic variation in at least one of the waveguide and the layer. Placing can include dip coating, drop coating, spin coating, painting or printing the layer including the nanocrystal on the surface. The method can include processing the surface of the optical waveguide prior to placing the nanocrystal.

In certain circumstances, at least one of the waveguide and the layer includes a periodic variation on a surface or interface, or the periodic variation is configured to restrict propagation of the emission wavelength of light along the waveguide. The periodic variation can be a periodic corrugation. The waveguide can be an optical fiber or a planar waveguide. The nanocrystal can be a semiconductor nanocrystal. The optical fiber can have a cladding layer that allows light to escape at a selected amount along the length of the fiber. The semiconductor nanocrystal can include a core including a first semiconductor material. The semiconductor nanocrystal can include an overcoating on a surface of the core including a second semiconductor material. A plurality of nanocrystals can be distributed at a first portion of the surface, a second portion of the surface, or combinations thereof. The plurality of nanocrystals distributed at the first portion of the surface can have a composition different from the plurality of nanocrystals distributed at the first portion of the surface.

Other features, objects and advantages will be apparent from the description, the drawings and the claims.

DETAILED DESCRIPTION

A light emitting structure can include a nanocrystal on a surface of an optical structure. The nanocrystal is coupled to the optical field of light propagating through the optical structure. For example, one or more semiconductor nanocrystals, or quantum dots, can be placed in the vicinity of an optical structure such as a waveguide, for example, a fiber optic element. In one example, a portion of the surface of the waveguide is coated with a thin layer of nanocrystals. The thin layer can be a monolayer or a multilayer. The optical field of light which is propagating through the waveguide can couple with the nanocrystal and cause them to emit light at an emission wavelength. See, for example, provisional U.S. Patent Application No. 60/474,805, filed May 21, 2006, and PCT Application No. US07/12040, filed May 22, 2007, each of which is incorporated by reference in its entirety.

Figure 2:
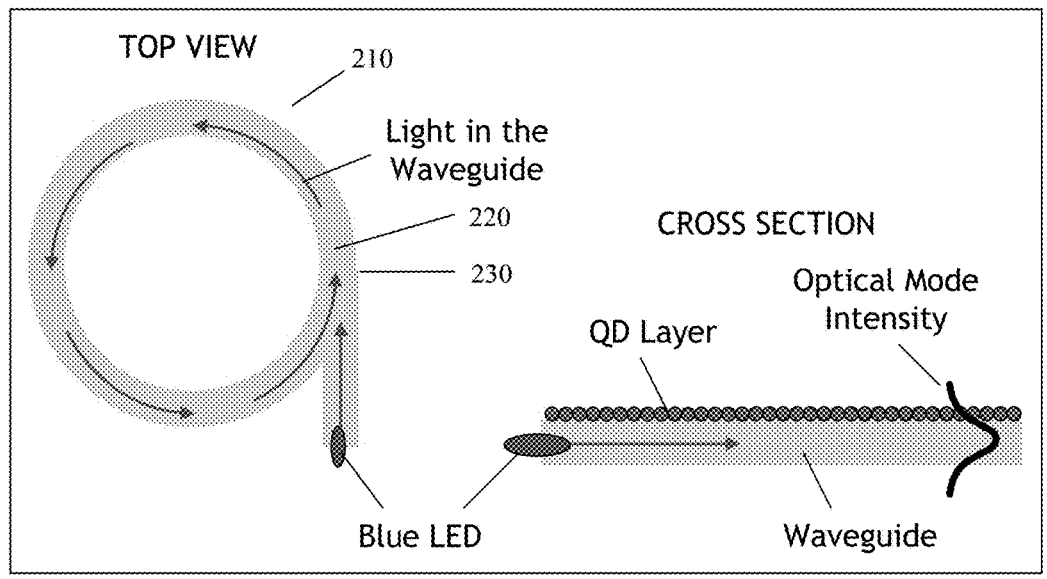
FIG. 2 is a schematic illustration of an optical structure including nanocrystals viewed from the top and from the side.

An example of an optical waveguide, shown in FIG. 2, is an optical fiber 210, which takes advantage of the total internal reflection (perfect mirroring) at the fiber core 220/cladding 230 dielectric interface to efficiently deliver light over long distances. The optical field energy in a typical optical fiber is almost entirely confined within the fiber core because of the dielectric index step at the core/cladding interface. It is possible, however, by thinning or removing the cladding layer to couple the light from inside the fiber core to materials which have been placed on the core surface. This occurs because the evanescent tails of the optical field penetrate a small distance beyond the core/cladding or core/air interface. The evanescent optical field can be used to excite dyes or other lumophores, such as QDs, with light which is otherwise normally confined to the fiber.

In designing of light managing structures certain constraints can be followed. All of the blue/UV LED light can be absorbed by nanocrystals and converted into nanocrystal luminescence with nearly 100% efficiency. Nanocrystal luminescence can quickly escape the light managing structures, minimizing the possibility of nanocrystal light re-absorption by other nanocrystals. Efficient light managing structures can use optical waveguides which guide blue/UV LED light, with external surfaces of the waveguides coated with thin films containing nanocrystals.

The layer has a thickness sufficient to generate a desired amount of light at the emission wavelength, and is thin enough to avoid significant self absorption of the emission wavelength. The composition and thickness of the nanocrystal layer, and the size, and distribution of sizes of the individual nanocrystals in the layer can be selected to generate a particular emission wavelength profile from each particular portion of the surface of the waveguide. In addition, the confinement of the propagating excitation wavelength of light provided by the waveguide can be tuned, for example by modifying the structure of the surface of the waveguide or thickness of the waveguide, to select the amount of excitation wavelength the nanocrystal will encounter at different positions along the surface. For example, it is possible to thin or remove portions of the cladding layer of a core-cladding optical fiber to couple the light propagating inside the fiber to materials which have been placed on its surface. This occurs because the optical field penetrates beyond the core/cladding or core/air interface a very small distance. The resulting evanescent optical field can be used to excite the nanocrystal on the surface of the waveguide with the light which is normally otherwise confined to the fiber.

The light emitted from the nanocrystals on different portions of the waveguide surface can generate a variety of colors and intensity levels, making the light emitting structure useful in a broad range of lighting applications, such as, for example, solid state lighting applications. An efficient excitation wavelength source can be distributed through the waveguide and downconverted at the point of use to an appropriate spectral composition by applying the right combination of downconverting elements at the surface of the waveguide, for example, a nanocrystal or combination of nanocrystals. Nanocrystals are an especially appropriate material to use for the downconversion because of their broad spectral tunability, long lifetime in photoluminescence (far exceeding that of organic dyes), and easy solution processability.

The optical structure can be configured to restrict propagation of the emission wavelength of light along the waveguide in order to limit or prevent propagation and facilitate release of the emission wavelength of light from the structure and out of the waveguide. The restricted propagation leads to enhanced outcoupling of the emission wavelength of light, not enhanced propagation of the emission wavelength of light. The restriction can take place by, for example, altering the structure of the waveguide to decrease the probability of propagating the emission wavelength of light in the waveguide.

The waveguide can include a periodic variation in structure, for example, a periodically corrugated structure on a surface or interface within the waveguide. A periodic variation (e.g., corrugation) at the interface between a thin film dielectric waveguide and the cladding material gives rise to a band gap in the waveguide propagation modes such that light with frequencies falling within this gap cannot propagate. See, for example, K. Sakuda and A. Yariv, "Analysis of Optical Propagation in a Corrugated Dielectric Waveguide," *Optics Communications*, May 1973, which is incorporated by reference in its entirety. By appropriate selection of the periodicity of the corrugation, light having wavelengths near the wavelength of nanocrystal emission light can fall within the optical gap. In such a device, light emitted by the nanocrystals cannot propagate in the waveguide. With such a feature, the nanocrystal emission cannot be emitted into the waveguide, and up to 2 fold, 3-fold, 4-fold or 5-fold external outcoupling efficiency gains can be achieved.

Because the nanocrystals emit light in all directions with equal probability, and the nanocrystals are embedded in a film of index $n_{NC\ FILM} > 1$ only a fraction of this light is able to escape out of the optical structure. Instead, a high proportion of downconverted light (i.e., light emitted by nanocrystals) is initially directed toward the waveguide. When the device lacks a corrugated feature, emitted light directed toward the waveguide will remain confined by the waveguide structure.

The nanocrystals can be placed on a surface of a waveguide by dip coating, drop coating, spin coating, painting or printing the nanocrystal on the surface. Printing can include ink jet printing or microcontact printing. Microcontact printing and related techniques are described in, for example, U.S. Pat. Nos. 5,512,131; 6,180,239; and 6,518,168, each of which is incorporated by reference in its entirety. In some circumstances, the stamp can be a featureless stamp having a pattern of ink, where the pattern is formed when the ink is applied to the stamp. See U.S. Patent Application Publication No. 20060196375, which is incorporated by reference in its entirety.

Figure 1:
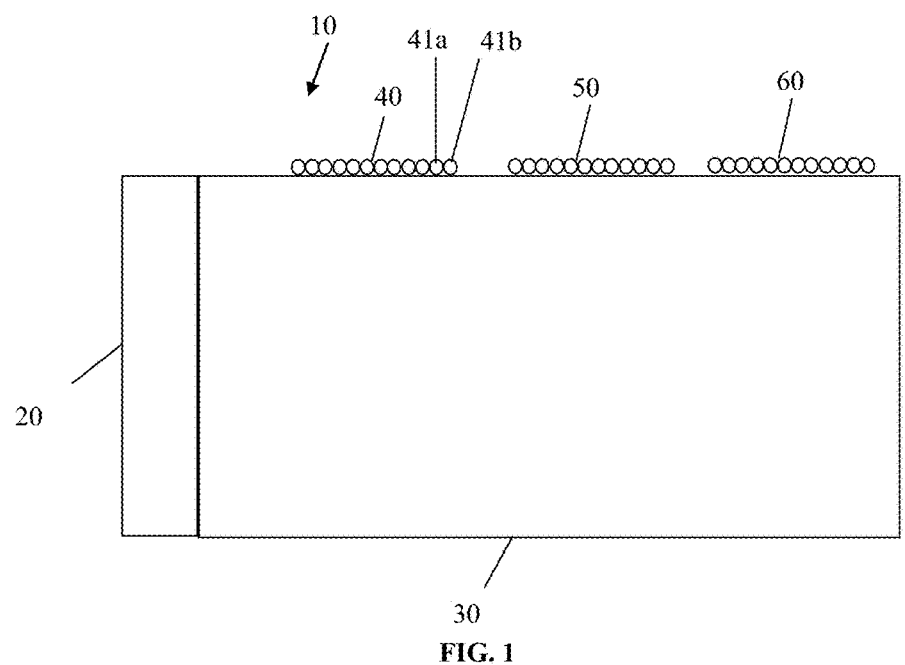
FIG. 1 is a schematic illustration of an optical structure including nanocrystals.

Referring to FIG. 1, light emitting structure 10 includes light source 20 arranged to couple light into optical waveguide 30. Light source 20 can be, for example, a laser or light emitting diode that emits light at a wavelength suitable to excite the nanocrystal and cause emission, for example, a blue light emitting diode. Nanocrystals on portions of the surface of optical waveguide 30 form nanocrystal regions, such as regions 40, 50 and 60. In each of these regions, one or more nanocrystals, for example, nanocrystals 41a and 41b form a layer. The layer can be a monolayer or a multilayer. The nanocrystals 41a and 41b can have a similar composition or size, i.e., can have a similar emission wavelength, or can have a different composition or size, i.e., can have a different emission wavelength. In each of the regions, the nanocrystals are selected to provide particular emission wavelengths of light, which in turn can provide different colors and intensities (or the same) at the various positions. The nanocrystal can be, for example, a semiconductor nanocrystal. The regions 40, 50 and 60 can contain other additives, including dyes, pigments, organic or inorganic matrix materials, or other components that can help protect the regions from degradation. Optionally, the regions can be coated by a protective material.

The waveguide can have a variety of different shapes or configurations. For example, another optical structure that can also contribute to efficient light downconversion is shown in FIG. 2. In this structure, the light is injected, for example by a blue light emitting diode (LED) in an optical waveguide coated with nanocrystals. The evanescent tail of the waveguide optical mode can be absorbed by the nanocrystal layer. The blue light that is not absorbed continues circling the waveguide until eventually absorbed by nanocrystals, which in turn convert the blue light into an emission wavelength of a different color. Again, the emission wavelength arises from the size and/or composition of the nanocrystal.

Figure 5A:
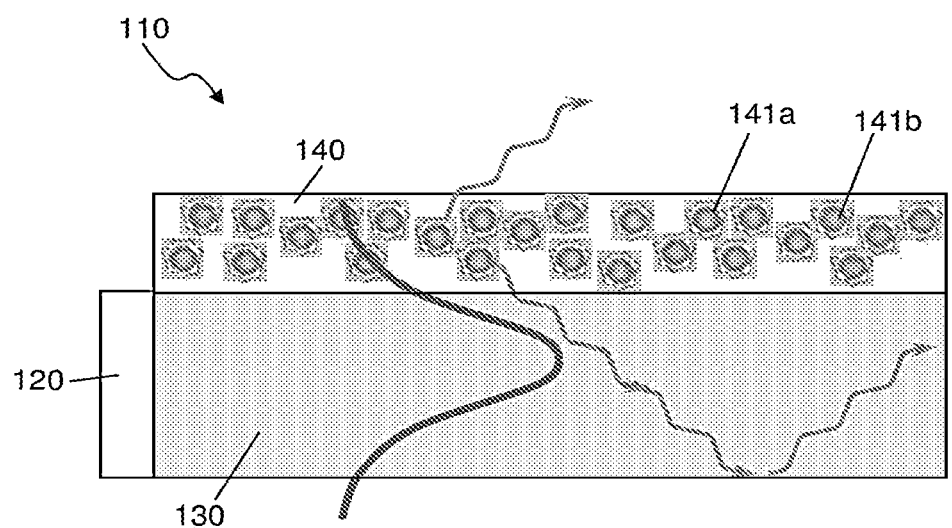
FIGS. 5A-5D are schematic illustrations of optical structures viewed from the side.
Figure 5B:
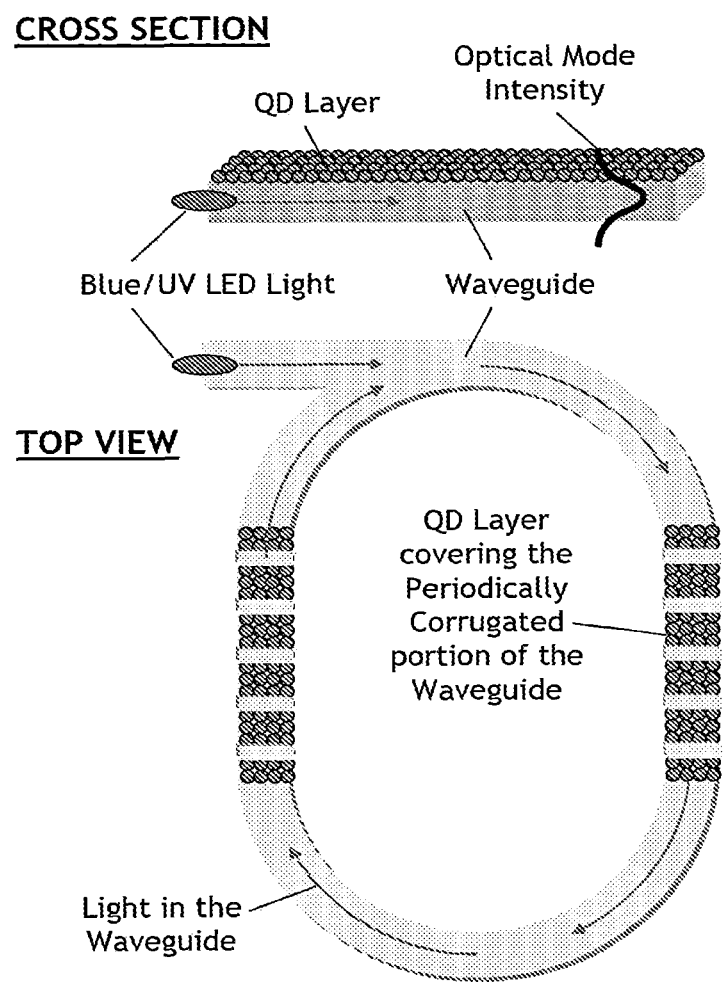
Figure 5C:
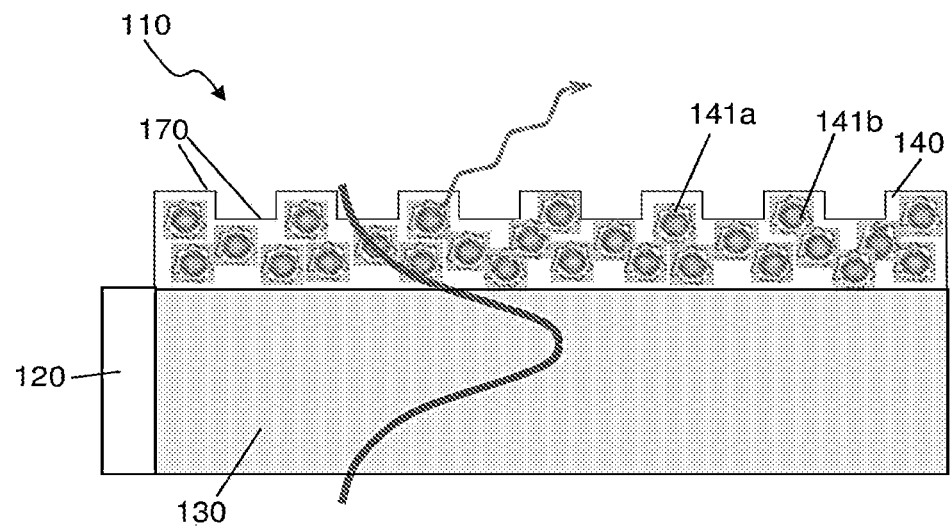

Referring to FIGS. 5A-5C, light emitting structure 110 includes light source 120 arranged to couple light into optical waveguide 130. Light source 120 can be, for example, a laser or light emitting diode that emits light at a wavelength suitable to excite the nanocrystal and cause emission, for example, a blue light emitting diode. Nanocrystal film 140 is disposed on a surface of optical waveguide 130. The optical mode of the excitation wavelength is illustrated schematically in blue. Nanocrystal emission is illustrated schematically in red. One or more nanocrystals, for example, nanocrystals 141a and 141b form a layer. The layer can be a monolayer or a multilayer. The nanocrystals 141a and 141b can have a similar composition or size, i.e., can have a similar emission wavelength, or can have a different composition or size, i.e., can have a different emission wavelength. In each of the regions, the nanocrystals are selected to provide particular emission wavelengths of light, which in turn can provide different colors and intensities (or the same) at the various positions. The nanocrystal can be, for example, a semiconductor nanocrystal. Film 140 can contain other additives, including dyes, pigments, organic or inorganic matrix materials, or other components that can help protect the film from degradation. Optionally, the film can be coated by a protective material. FIG. 5A illustrates an embodiment in which nanocrystal film 140 lacks corrugation.

Nanocrystals are solution processed at room temperature, simplifying nanocrystal mixing/coating, and nanocrystal-containing films are cured at near room temperature, facilitation ease of integration with other optical structures, or nanocrystals-film molding for efficient light outcoupling. The index of refraction of nanocrystal-containing films can be precisely tuned in the range of n=1.3 to n=1.8 by choosing the nanocrystal host material. As an example, silica and titania or composite silica/titania films can be used. Titania has a higher index of refraction than silica, so by changing the ratio of the two the index can be tuned. Also, by generating nanoscale voids in the films, the index of refraction can be reduced. As another example, polymeric films can be used, such as polyfluorinated materials, or acrylates. The index of refraction can be adjusted by modifying the composition of the film using these or other materials. Controlling the refractive index of the nanocrystal film allows precise tuning of the optical modes of the optical structures. Nanocrystal-containing film stability in photoluminescence far exceeds that of conventional organic dye lumophores. The stability of nanocrystal films in PL should match or even exceed the lifetime of inorganic blue/UV LEDs, enabling development of robust and long lived lighting systems.

Another, more compact optical structure for efficient light downconversion is shown in FIG. 5B. In this structure the light is injected into a looped optical waveguide coated with a thin film containing QDs (see the "top view" of FIG. 5B). As shown in the "cross-section" illustration of a segment of the waveguide coated with a nanocrystal layer, evanescent tail of the waveguided optical mode is absorbed by the nanocrystal layer. The blue light that is not absorbed continues circling the waveguide for multiple passes, until it is eventually absorbed by the nanocrystal thin film. In this light recycling scheme, optical losses of blue/UV light are minimized. Due to light recycling, the entire loop waveguide can cover an area of $cm^2$ or less, miniaturizing the light system. Thus, a loop waveguide can be constructed by considering a few parameters in its design.

The optically excited nanocrystals are designed to have 75% or higher photoluminescence quantum efficiency. Excited by the blue/UV LED, the nanocrystal color centers will re-radiate their own characteristic luminescence spectrum. The nanocrystal-emitted luminescence is directed in all directions with similar probability, but since nanocrystals are imbedded in a film of index $n_{QD\ FILM} > 1$ only a fraction of the nanocrystal light is able to escape out of the nanocrystal film/waveguide structure into air. Nanocrystal luminescence that is propagating in a direction not substantially orthogonal to the nanocrystal film surface will undergo total internal reflection and be redirected into the optical waveguide.

Figure 5D:
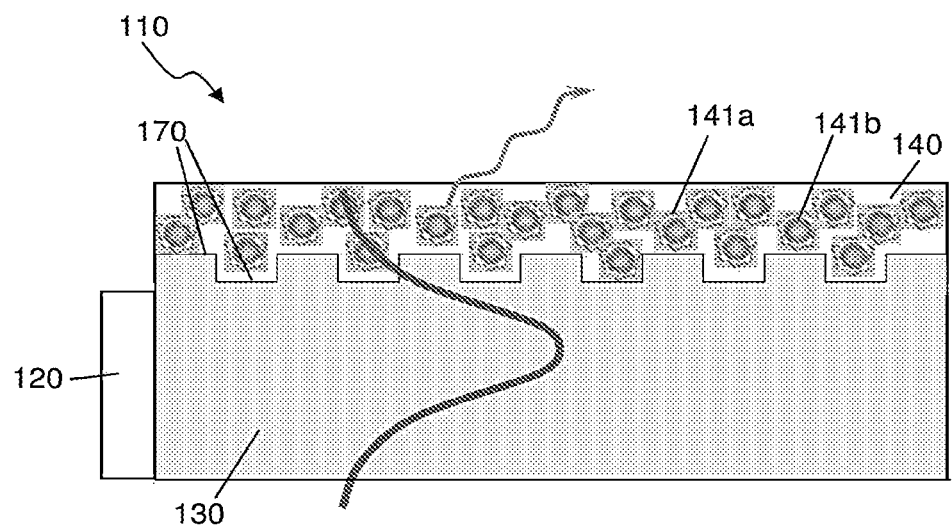

FIGS. 5C-5D illustrate two configurations of periodically corrugated waveguides. In FIG. 5C, a waveguide is pictured that has a periodic corrugation 170 in the nanocrystal film, at the film/external media interface. The external media can be air. In this configuration, the refractive indices of the waveguide and the nanocrystal film need not differ. FIG. 5D illustrates a structure in which the waveguide/nanocrystal film interface has corrugated structure 170. In this configuration, the indices of refraction of the waveguide and the nanocrystal film have to differ for corrugation to have effect. As pictured, the corrugation can be a periodic set of alternating indentations or projections, with the distance between comparable to the wavelength of light to be excluded from the waveguide. See, for example, K. Sakuda and A. Yariv, "Analysis of Optical Propagation in a Corrugated Dielectric Waveguide," *Optics Communications*, May 1973, which is incorporated by reference in its entirety. The corrugation, a sub-micron periodic pattern, can be generated on top of the waveguide by mechanical imprinting of a grating, which can be commercially obtained, or prepared using interference lithography.

For values of $n_{NC\ FILM}$ and $n_{WAVEGUIDE}$ in the range of 1.3 to 1.8, more than 80% of the radiation emitted by nanocrystals will not escape into air, but will rather be waveguided, as determined by simple ray tracing and as pictured in the FIG. 5A. The nanocrystal luminescence in the waveguide can be re-absorbed by other nanocrystals, and as long as the nanocrystal photoluminescence quantum efficiency is less than unity, the waveguided nanocrystal luminescence will eventually be entirely attenuated through multiple re-absorptions. This nanocrystal luminescence re-absorption due to the $n_{NC\ FILM}>1$ has hampered previous attempts at utilizing nanocrystal luminescence downconversion, because it causes low outcoupling efficiencies. The nanocrystal luminescence in the waveguide can be re-absorbed by other nanocrystals, and as long as the nanocrystal PL quantum efficiency is less than unity, the waveguided nanocrystal luminescence will eventually be entirely attenuated through multiple re-absorptions. This nanocrystal luminescence re-absorption due to the $n_{QD\ FILM}>1$ can make it difficult to utilize nanocrystal luminescence downconversion, resulting in low outcoupling efficiencies. The structures described here offer a solution to this challenge and can extract over 90% of nanocrystal emitted light.

In contrast, the structures of FIGS. 5B, 5C and 5D have periodic corrugations that forbid light having wavelengths near that of the nanocrystal emission from being waveguided. Thus, nanocrystal emission light is efficiently released from the optical structure, instead of undergoing waveguiding and reabsorption. The optical structure can emit greater than 25%, greater than 50%, greater than 60%, greater than 70%, greater than 80%, or greater than 90% of nanocrystal-emitted light.

In general, the light source, such as the blue LED, can be any other LED or other light source. In addition, any nanocrystals can be coated on the surface of the optical structures, but only the nanocrystals that can absorb the excitation spectrum produced by the light source will be excited by the light. The nanocrystal film can consist of a mixture of different nanocrystals. For example, combinations of nanocrystals can be used to generate a white light spectrum. The thickness of the nanocrystal film can be adjusted in order to optimize the spectral emission. Also, it is usually desirable to minimize nanocrystal light self absorption which predicates use of the very thin nanocrystal films.

The semiconductor nanocrystals can have a broad absorption band with an intense, narrow band emission. The peak wavelength of emission can be tuned from throughout the visible and infrared regions, depending on the size, shape, composition, and structural configuration of the nanocrystals. The nanocrystals can be prepared with an outer surface having desired chemical characteristics (such as a desired solubility). Light emission by nanocrystals can be stable for long periods of time.

When a nanocrystal achieves an excited state (or in other words, an exciton is located on the nanocrystal), emission can occur at an emission wavelength. The emission has a frequency that corresponds to the band gap of the quantum confined semiconductor material. The band gap is a function of the size of the nanocrystal. Nanocrystals having small diameters can have properties intermediate between molecular and bulk forms of matter. For example, nanocrystals based on semiconductor materials having small diameters can exhibit quantum confinement of both the electron and hole in all three dimensions, which leads to an increase in the effective band gap of the material with decreasing crystallite size. Consequently, both the optical absorption and emission of nanocrystals shift to the blue, or to higher energies, as the size of the crystallites decreases.

The emission from the nanocrystal can be a narrow Gaussian emission band that can be tuned through the complete wavelength range of the ultraviolet, visible, or infrared regions of the spectrum by varying the size of the nanocrystal, the composition of the nanocrystal, or both. For example, CdSe can be tuned in the visible region and InAs can be tuned in the infrared region. The narrow size distribution of a population of nanocrystals can result in emission of light in a narrow spectral range. The population can be monodisperse and can exhibit less than a 15% rms deviation in diameter of the nanocrystals, preferably less than 10%, more preferably less than 5%. Spectral emissions in a narrow range of no greater than about 75 nm, preferably 60 nm, more preferably 40 nm, and most preferably 30 nm full width at half max (FWHM) for nanocrystals that emit in the visible can be observed. IR-emitting nanocrystals can have a FWHM of no greater than 150 nm, or no greater than 100 nm. Expressed in terms of the energy of the emission, the emission can have a FWHM of no greater than 0.05 eV, or no greater than 0.03 eV. The breadth of the emission decreases as the dispersity of nanocrystal diameters decreases. Semiconductor nanocrystals can have high emission quantum efficiencies such as greater than 10%, 20%, 30%, 40%, 50%, 60%, 70%, or 80%.

The semiconductor forming the nanocrystals can include a Group II-VI compound, a Group II-V compound, a Group III-VI compound, a Group III-V compound, a Group IV-VI compound, a Group compound, a Group II-IV-VI compound, or a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof.

Methods of preparing monodisperse semiconductor nanocrystals include pyrolysis of organometallic reagents, such as dimethyl cadmium, injected into a hot, coordinating solvent. This permits discrete nucleation and results in the controlled growth of macroscopic quantities of nanocrystals.

Preparation and manipulation of nanocrystals are described, for example, in U.S. Pat. Nos. 6,322,901 and 6,576,291, and U.S. Patent Application No. 60/550,314, each of which is incorporated by reference in its entirety. The method of manufacturing a nanocrystal is a colloidal growth process. Colloidal growth occurs by rapidly injecting an M donor and an X donor into a hot coordinating solvent. The injection produces a nucleus that can be grown in a controlled manner to form a nanocrystal. The reaction mixture can be gently heated to grow and anneal the nanocrystal. Both the average size and the size distribution of the nanocrystals in a sample are dependent on the growth temperature. The growth temperature necessary to maintain steady growth increases with increasing average crystal size. The nanocrystal is a member of a population of nanocrystals. As a result of the discrete nucleation and controlled growth, the population of nanocrystals obtained has a narrow, monodisperse distribution of diameters. The monodisperse distribution of diameters can also be referred to as a size. The process of controlled growth and annealing of the nanocrystals in the coordinating solvent that follows nucleation can also result in uniform surface derivatization and regular core structures. As the size distribution sharpens, the temperature can be raised to maintain steady growth. By adding more M donor or X donor, the growth period can be shortened.

The M donor can be an inorganic compound, an organometallic compound, or elemental metal. M is cadmium, zinc, magnesium, mercury, aluminum, gallium, indium or thallium. The X donor is a compound capable of reacting with the M donor to form a material with the general formula MX. Typically, the X donor is a chalcogenide donor or a pnictide donor, such as a phosphine chalcogenide, a bis(silyl) chalcogenide, dioxygen, an ammonium salt, or a tris(silyl) pnictide. Suitable X donors include dioxygen, bis(trimethylsilyl) selenide ((TMS)$_2$Se), trialkyl phosphine selenides such as (tri-n-octylphosphine) selenide (TOPSe) or (tri-n-butylphosphine) selenide (TBPSe), trialkyl phosphine tellurides such as (tri-n-octylphosphine) telluride (TOPTe) or hexapropylphosphorustriamide telluride (HPPTTe), bis(trimethylsilyl)telluride ((TMS)$_2$Te), bis(trimethylsilyl)sulfide ((TMS)$_2$S), a trialkyl phosphine sulfide such as (tri-n-octylphosphine) sulfide (TOPS), an ammonium salt such as an ammonium halide (e.g., NH$_4$Cl), tris(trimethylsilyl) phosphide ((TMS)$_3$P), tris(trimethylsilyl) arsenide ((TMS)$_3$As), or tris(trimethylsilyl) antimonide ((TMS)$_3$Sb). In certain embodiments, the M donor and the X donor can be moieties within the same molecule.

A coordinating solvent can help control the growth of the nanocrystal. The coordinating solvent is a compound having a donor lone pair that, for example, has a lone electron pair available to coordinate to a surface of the growing nanocrystal. Solvent coordination can stabilize the growing nanocrystal. Typical coordinating solvents include alkyl phosphines, alkyl phosphine oxides, alkyl phosphonic acids, or alkyl phosphinic acids, however, other coordinating solvents, such as pyridines, furans, and amines may also be suitable for the nanocrystal production. Examples of suitable coordinating solvents include pyridine, tri-n-octyl phosphine (TOP), tri-n-octyl phosphine oxide (TOPO) and tris-hydroxylpropylphosphine (tHPP). Technical grade TOPO can be used.

Size distribution during the growth stage of the reaction can be estimated by monitoring the absorption line widths of the particles. Modification of the reaction temperature in response to changes in the absorption spectrum of the particles allows the maintenance of a sharp particle size distribution during growth. Reactants can be added to the nucleation solution during crystal growth to grow larger crystals. By stopping growth at a particular nanocrystal average diameter and choosing the proper composition of the semiconducting material, the emission spectra of the nanocrystals can be tuned continuously over the wavelength range of 300 nm to 5 microns, or from 400 nm to 800 nm for CdSe and CdTe. The nanocrystal has a diameter of less than 150 Å. A population of nanocrystals has average diameters in the range of 15 Å to 125 Å.

The nanocrystal can be a member of a population of nanocrystals having a narrow size distribution. The nanocrystal can be a sphere, rod, disk, or other shape. The nanocrystal can include a core of a semiconductor material. The nanocrystal can include a core having the formula MX, where M is cadmium, zinc, magnesium, mercury, aluminum, gallium, indium, thallium, or mixtures thereof, and X is oxygen, sulfur, selenium, tellurium, nitrogen, phosphorus, arsenic, antimony, or mixtures thereof.

The core can have an overcoating on a surface of the core. The overcoating can be a semiconductor material having a composition different from the composition of the core. The overcoat of a semiconductor material on a surface of the nanocrystal can include a Group II-VI compound, a Group II-V compound, a Group III-VI compound, a Group III-V compound, a Group IV-VI compound, a Group compound, a Group II-IV-VI compound, and a Group II-IV-V compound, for example, ZnO, ZnS, ZnSe, ZnTe, CdO, CdS, CdSe, CdTe, MgO, MgS, MgSe, MgTe, HgO, HgS, HgSe, HgTe, AlN, AlP, AlAs, AlSb, GaN, GaP, GaAs, GaSb, InN, InP, InAs, InSb, TlN, TlP, TlAs, TlSb, TlSb, PbS, PbSe, PbTe, or mixtures thereof. For example, ZnS, ZnSe or CdS overcoatings can be grown on CdSe or CdTe nanocrystals. An overcoating process is described, for example, in U.S. Pat. No. 6,322,901. By adjusting the temperature of the reaction mixture during overcoating and monitoring the absorption spectrum of the core, over coated materials having high emission quantum efficiencies and narrow size distributions can be obtained. The overcoating can be between 1 and 10 monolayers thick.

The particle size distribution can be further refined by size selective precipitation with a poor solvent for the nanocrystals, such as methanol/butanol as described in U.S. Pat. No. 6,322,901. For example, nanocrystals can be dispersed in a solution of 10% butanol in hexane. Methanol can be added dropwise to this stirring solution until opalescence persists. Separation of supernatant and flocculate by centrifugation produces a precipitate enriched with the largest crystallites in the sample. This procedure can be repeated until no further sharpening of the optical absorption spectrum is noted. Size-selective precipitation can be carried out in a variety of solvent/nonsolvent pairs, including pyridine/hexane and chloroform/methanol. The size-selected nanocrystal population can have no more than a 15% rms deviation from mean diameter, preferably 10% rms deviation or less, and more preferably 5% rms deviation or less.

The outer surface of the nanocrystal can include compounds derived from the coordinating solvent used during the growth process. The surface can be modified by repeated exposure to an excess of a competing coordinating group. For example, a dispersion of the capped nanocrystal can be treated with a coordinating organic compound, such as pyridine, to produce crystallites which disperse readily in pyridine, methanol, and aromatics but no longer disperse in aliphatic solvents. Such a surface exchange process can be carried out with any compound capable of coordinating to or bonding with the outer surface of the nanocrystal, including, for example, phosphines, thiols, amines and phosphates. The nanocrystal can be exposed to short chain polymers which exhibit an affinity for the surface and which terminate in a moiety having an affinity for a suspension or dispersion medium. Such affinity improves the stability of the suspension and discourages flocculation of the nanocrystal. Nanocrystal coordinating compounds are described, for example, in U.S. Pat. No. 6,251,303, which is incorporated by reference in its entirety.

More specifically, the coordinating ligand can have the formula:

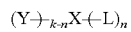

wherein k is 2, 3 or 5, and n is 1, 2, 3, 4 or 5 such that k−n is not less than zero; X is O, S, S=O, $SO_2$, Se, Se=O, N, N=O, P, P=O, As, or As=O; each of Y and L, independently, is aryl, heteroaryl, or a straight or branched $C_{2-12}$ hydrocarbon chain optionally containing at least one double bond, at least one triple bond, or at least one double bond and one triple bond. The hydrocarbon chain can be optionally substituted with one or more $C_{1-4}$ alkyl, $C_{2-4}$ alkenyl, $C_{2-4}$ alkynyl, $C_{1-4}$ alkoxy, hydroxyl, halo, amino, nitro, cyano, $C_{3-5}$ cycloalkyl, 3-5 membered heterocycloalkyl, aryl, heteroaryl, $C_{1-4}$ alkylcarbonyloxy, $C_{1-4}$ alkyloxycarbonyl, $C_{1-4}$ alkylcarbonyl, or formyl. The hydrocarbon chain can also be optionally interrupted by —O—, —S—, —N($R^a$)—, —N($R^a$)—C(O)—O—, —O—C(O)—N($R^a$)—, —N($R^a$)—C(O)—N($R^b$)—, —O—C(O)—O—, —P($R^a$)—, or —P(O)($R^a$)—. Each of $R^a$ and $R^b$, independently, is hydrogen, alkyl, alkenyl, alkynyl, alkoxy, hydroxylalkyl, hydroxyl, or haloalkyl.

An aryl group is a substituted or unsubstituted cyclic aromatic group. Examples include phenyl, benzyl, naphthyl, tolyl, anthracyl, nitrophenyl, or halophenyl. A heteroaryl group is an aryl group with one or more heteroatoms in the ring, for instance furyl, pyiridyl, pyrrolyl, phenanthryl.

A suitable coordinating ligand can be purchased commercially or prepared by ordinary synthetic organic techniques, for example, as described in J. March, *Advanced Organic Chemistry*, which is incorporated by reference in its entirety.

Transmission electron microscopy (TEM) can provide information about the size, shape, and distribution of the nanocrystal population. Powder X-ray diffraction (XRD) patterns can provide the most complete information regarding the type and quality of the crystal structure of the nanocrystals. Estimates of size are also possible since particle diameter is inversely related, via the X-ray coherence length, to the peak width. For example, the diameter of the nanocrystal can be measured directly by transmission electron microscopy or estimated from X-ray diffraction data using, for example, the Scherrer equation. It also can be estimated from the UV/Vis absorption spectrum.

EXAMPLE

One example of an optical structure including nanocrystals is described below.

Figure 3:
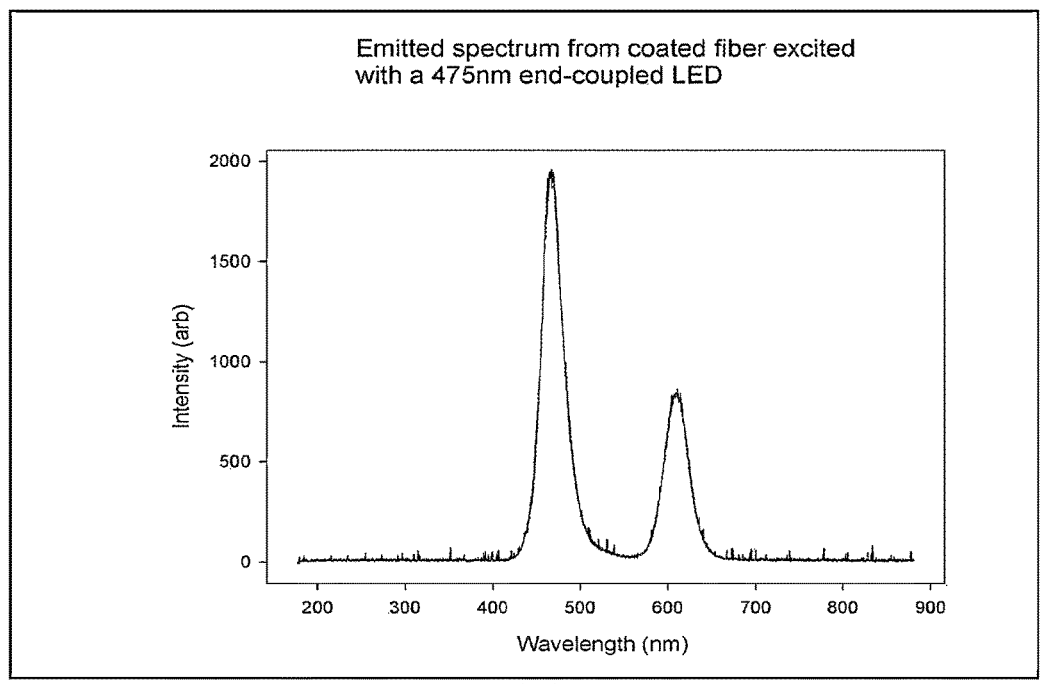
FIG. 3 is a graph displaying a light emission from an optical structure including nanocrystals.
Figure 4:
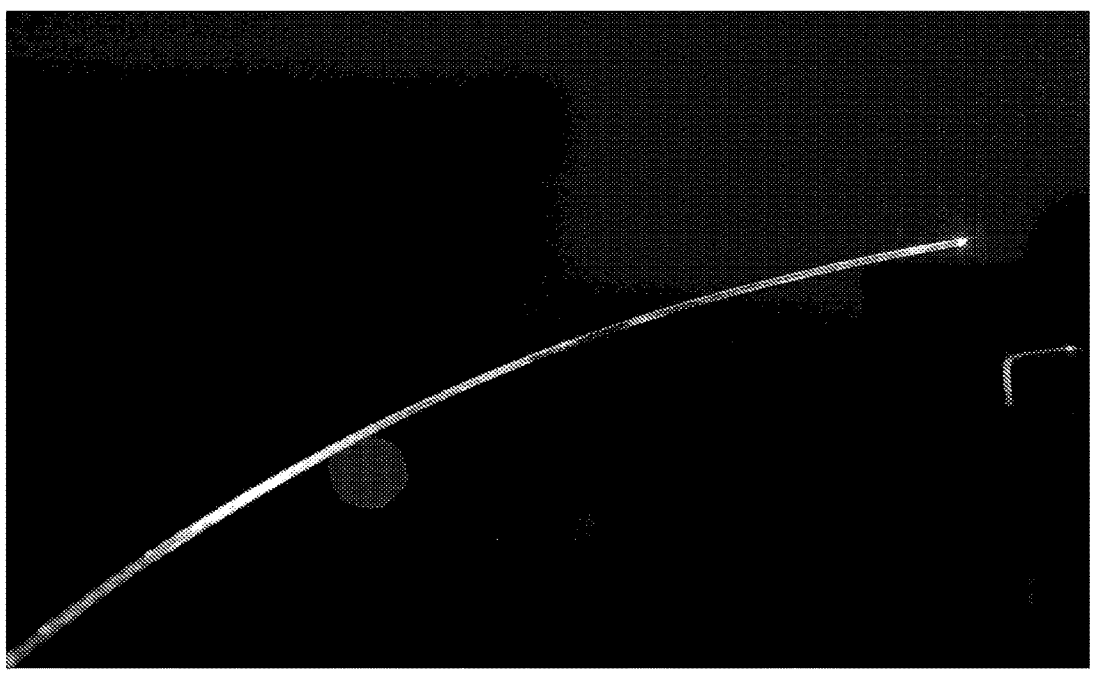
FIG. 4 is a photograph illustrating light emission from an optical structure including nanocrystals.

A conventional 0.5 mm plastic fiber optic element was stripped of its sheath and cladding. The cladding was removed by soaking the fiber in acetone and wiping the fiber to remove the dissolved cladding material. Red luminescent semiconductor nanocrystals (quantum dots) in an ethanol solution were then applied to the exterior of the stripped fiber. The nanocrystal layer was allowed to dry. A conventional fiber optic end-coupled 475 nm light emitting diode was then attached to the fiber and turned on. FIG. 3 shows the spectrum of light emitted from the fiber. It is clear from the spectrum that the evanescent wave couples to the nanocrystals, which then emitted red light. Some of the excitation light was also emitted from the fiber, likely because of the surface roughness of the fiber that scatters the fiber-guided blue light. FIG. 4 shows a photograph of the light emitting structure. Red light from the evanescent wave coupled nanocrystals is easily visible.

Figure 6:
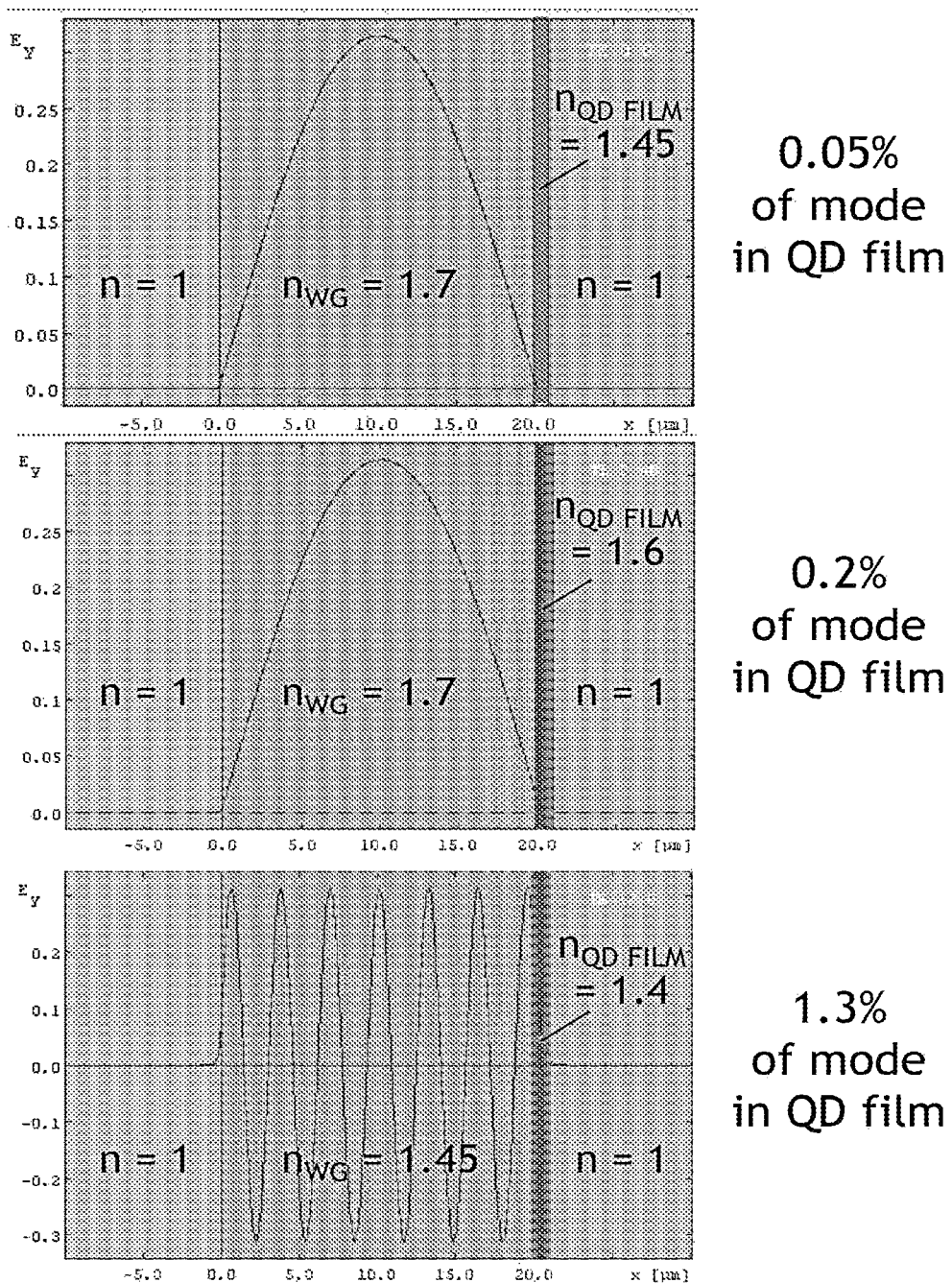
FIG. 6 is a series of graphs depicting optical properties of optical structures.

Values of $n_{WAVEGUIDE}$ that are higher than $n_{NC\ FILM}$ ensure that the waveguided optical mode is primarily located in the optically clear waveguide. In FIG. 6 models of the optical field intensity of the light inside the waveguide/nanocrystal film structure for three sets of values of $n_{WAVEGUIDE}$ and $n_{NC\ FILM}$ are illustrated.

The larger the fractional difference between the two indices, the smaller the fraction of the waveguided mode resides in the nanocrystal film. Percent values are indicated in FIG. 6 for the three examples. The fraction of the blue light that propagates in the nanocrystal film can be absorbed by the nanocrystals, resulting in nanocrystal luminescence. By adjusting the value of $n_{WAVEGUIDE}$ and $n_{NC\ FILM}$, the distance over which the blue/UV LED light will be absorbed can be controlled. Additionally, by controlling the concentration of nanocrystals in the film, the optical density, OD, and the absorption coefficient, α, of the nanocrystal film at the wavelength corresponding to blue/UV LED emission can be controlled.

For a typical neat nanocrystal thin film emitting in green-to-red part of the spectrum, the absorption coefficient for blue (λ~475 nm) light is on the order of α=$10^5$ $cm^{-1}$. The nanocrystal film can have nanocrystal loading of, for example, 0.1% to 1% by volume, corresponding to α in the range of 100 $cm^{-1}$ to 1000 $cm^{-1}$.

Figure 7:
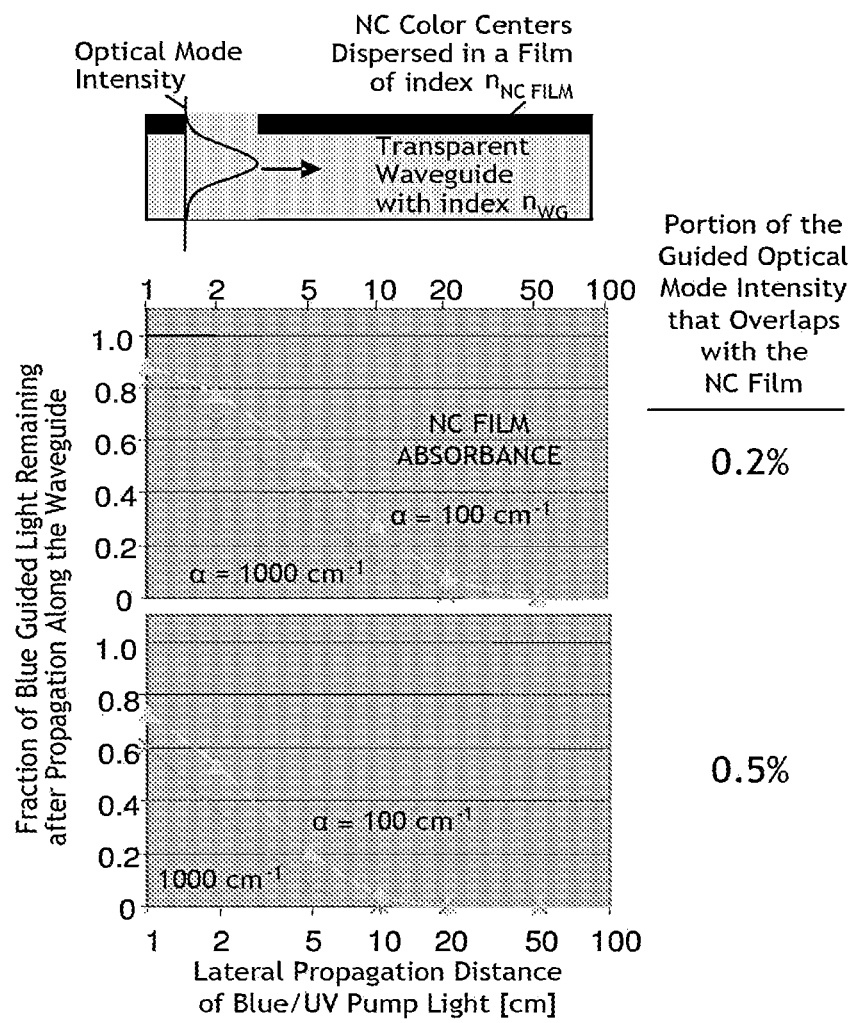
FIG. 7 is a series of graphs depicting optical properties of optical structures.

FIG. 7 illustrates models of the gradual attenuation of the blue/UV guided light due absorption by the nanocrystal-containing film for two different values of α. The two plots correspond to two waveguide designs, where for each the $n_{WAVEGUIDE}$ and $n_{NC\ FILM}$ values are chosen so that the fraction of waveguided optical mode overlapping with the NC-containing film was as indicated.

In certain embodiments, the blue/UV LED scan be replaced with any other color LED, as needed to shape the emission spectrum. As in the present structures, the spectrum of these modified devices would be a composite of scattered LED light and nanocrystal luminescence determined by the mixture of nanocrystal lumophores that are excited by the LED light source. Any nanocrystals can be coated on top of the optical structures, but only the nanocrystals that can absorb the LED spectrum will be excited by the LED light. The nanocrystal film can consist of a mixture of different nanocrystals. For example, this is desirable in order to generate white light spectrum. The thickness of the nanocrystal film can be adjusted in order to optimize the spectral emission. It is usually desirable to minimize nanocrystal light self absorption which predicates use of the very thin nanocrystal films.

Other embodiments are within the scope of the following claims.

What is claimed is:

1. An optical structure comprising an optical fiber including a fiber core including a cladding layer having a region, the region of the cladding layer including a thinned or removed portion of the cladding layer and allowing light to escape at a selected amount along the length of the fiber, and a layer including a nanocrystal capable of emitting light at an emission wavelength when excited by an excitation wavelength, the layer being disposed on a surface of the optical fiber, the nanocrystal being positioned to be optically coupled to an optical field propagating through the optical fiber, wherein the optical fiber is configured to restrict propagation of the emission wavelength of light along the length of the optical fiber.

2. The optical structure of claim 1, wherein at least one of the optical fiber and the cladding layer includes a periodic variation on a surface or interface.

3. The optical structure of claim 2, wherein the periodic variation is configured to restrict propagation of the emission wavelength of light along the fiber.

4. The optical structure of claim 2, wherein the periodic variation is a periodic corrugation.

5. The optical structure of claim 1, wherein the nanocrystal is a semiconductor nanocrystal.

6. The optical structure of claim 5, wherein the semiconductor nanocrystal includes a core including a first semiconductor material.

7. The optical structure of claim 6, wherein the semiconductor nanocrystal includes an overcoating on a surface of the core including a second semiconductor material.

8. The optical structure of claim 1, further comprising a plurality of nanocrystals distributed at a second portion of the surface.

9. The optical structure of claim 8, wherein the plurality of nanocrystals distributed at the first portion of the surface has a composition different from the plurality of nanocrystals distributed at the second portion of the surface.

10. A light emitting structure comprising:
a light source arranged to introduce light including an excitation wavelength into an optical fiber including a fiber core including a cladding layer including a region, the region of the cladding layer including a thinned or removed portion of the cladding layer and allowing light to escape at a selected amount along the length of the fiber; and
a layer including a nanocrystal capable of emitting light at an emission wavelength when excited by the excitation wavelength, the layer being disposed on a surface of the optical fiber, the nanocrystal being positioned to be optically coupled to an optical field propagating through the optical fiber, wherein the optical fiber includes a periodic variation configured to restrict propagation of the emission wavelength of light along the length of the optical fiber.

* * * * *